United States Patent
Okai et al.

(10) Patent No.: US 7,259,711 B2
(45) Date of Patent: Aug. 21, 2007

(54) VEHICLE CONTROL APPARATUS (75) Inventors: Fumihiko Okai, Hitachinaka (JP); Hiroshi Kuroda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 10/739,223

(22) Filed: Dec. 19, 2003

(65) Prior Publication Data

US 2004/0130481 A1    Jul. 8, 2004

Related U.S. Application Data (63) Continuation of application No. 10/083,473, filed on Feb. 27, 2002, now Pat. No. 6,819,283.

(30) Foreign Application Priority Data

Jul. 18, 2001 (JP) .............................. 2001-217515

(51) Int. Cl.
G01S 13/93 (2006.01)
G01S 7/40 (2006.01)
G01S 13/00 (2006.01)

(52) U.S. Cl. ............................ 342/71; 342/27; 342/70; 342/72; 342/165; 342/173; 342/175; 342/195

(58) Field of Classification Search .............. 342/70–72, 342/165–175, 195, 27, 28; 180/167–169; 701/300, 301
See application file for complete search history.

(56) References Cited

U.S. PATENT DOCUMENTS

| | | | | |
|---|---|---|---|---|
| 3,703,702 A | * | 11/1972 | Arai | 342/171 |
| 4,180,816 A | * | 12/1979 | Endo et al. | 342/70 |
| 5,432,516 A | * | 7/1995 | Cherry et al. | 342/70 |
| 5,530,651 A | * | 6/1996 | Uemura et al. | 701/301 |
| 5,710,565 A | * | 1/1998 | Shirai et al. | 342/70 |
| 6,147,637 A | * | 11/2000 | Morikawa et al. | 342/70 |
| 6,275,772 B1 | * | 8/2001 | Sugimoto et al. | 701/301 |
| 6,278,399 B1 | * | 8/2001 | Ashihara | 342/173 |
| 6,348,889 B1 | * | 2/2002 | Ashihara et al. | 342/70 |
| 6,369,747 B1 | * | 4/2002 | Ashihara | 342/70 |
| 6,384,768 B1 | * | 5/2002 | Kai | 342/70 |
| 6,414,623 B1 | * | 7/2002 | Ashihara | 342/70 |

(Continued)

FOREIGN PATENT DOCUMENTS

DE    199 45 250 A    4/2001

(Continued)

OTHER PUBLICATIONS

Japanese Office Action dated Aug. 22, 2006 with English translation of pertinent portion (Five (5) pages).

*Primary Examiner*—Bernarr E. Gregory
(74) *Attorney, Agent, or Firm*—Crowell & Moring LLP (57) ABSTRACT

A vehicle control apparatus includes an obstruction detection unit for measuring a headway distance until an obstruction existing ahead of the vehicle by means of a radar device, a unit for performing vehicle control or alarm control on the basis of the headway distance, a unit for detecting detection performance of the obstruction detection means in a vehicle in which the obstruction detection unit is used to perform two or more controls containing the vehicle control or alarm control, and a unit for controlling to stop operation of the vehicle control or alarm control in accordance with the detection performance individually.

9 Claims, 10 Drawing Sheets

U.S. PATENT DOCUMENTS

| | | | |
|---|---|---|---|
| 6,414,628 B1 * | 7/2002 | Ashihara | 343/173 |
| 6,469,659 B1 * | 10/2002 | Lajiness et al. | 342/173 |
| 6,476,760 B1 * | 11/2002 | Winter et al. | 342/173 |
| 6,611,227 B1 * | 8/2003 | Nebiyeloul-Kifle et al. | 342/173 |
| 6,750,811 B2 * | 6/2004 | Asanuma et al. | 342/174 |
| 6,900,755 B2 * | 5/2005 | Richardson et al. | 342/174 |
| 6,903,680 B2 * | 6/2005 | Samukawa et al. | 342/173 |
| 6,954,174 B2 * | 10/2005 | Isaji et al. | 342/173 |
| 2001/0035839 A1 * | 11/2001 | Shiratori et al. | 342/70 |

FOREIGN PATENT DOCUMENTS

| | | |
|---|---|---|
| JP | 6-52500 | 2/1994 |
| JP | 10-81156 | 3/1998 |
| JP | 2000-113397 A | 4/2000 |

* cited by examiner

| DETECTION PERFORMANCE LEVEL (MAXIMUM DETECTION DISTANCE) | ACC CONTROL | TRACKING-UPON-CONGESTION CONTROL | HEADWAY DISTANCE ALARM | COLLISION REDUCTION CONTROL |
| --- | --- | --- | --- | --- |
| 2 (120 m OR MORE) | ON | ON | ON | ON |
| 1 (40~120m) | OFF | ON | ON | ON |
| 0 (0~40m) | OFF | OFF | ON | ON |

| Sx-Sm<br>(CHANGE AMOUNT OF CENTER POSITIONS OF DISTRIBUTION OF CALCULATED RCS VALUES) | DETECTION PERFORANCE LEVEL<br>(MAXIMUM DETECTION DISTANCE) |
|---|---|
| 0 dB OR MORE | 2<br>(120 m OR MORE) |
| -19 ~ 0 dB | 1<br>(40~120m) |
| LESS THAN -19 dB | 0<br>(0~40m) |

VEHICLE CONTROL APPARATUS

This application is a continuation of U.S. patent application Ser. No. 10/083,473, filed Feb. 27, 2002, now U.S. Pat. No. 6,819,283.

BACKGROUND OF THE INVENTION

The present invention relates to a radar apparatus for detecting an object on the periphery of a vehicle and a vehicle control apparatus for operating two or more traveling control apparatuses or alarm control apparatuses by means of the radar apparatus and stopping operation of traveling control or alarm control when detection performance of the radar apparatus is deteriorated.

Heretofore, in order to perform traveling control or alarm control of a vehicle, position information of a target detected by a radar apparatus mounted in a vehicle or relative speed information between the target and the vehicle is used. In such control, when detection performance of the radar apparatus is reduced due to a heavy rain or dirt attached to the surface of the radar apparatus, the traveling control or the alarm control cannot be performed in safety and accordingly avoidance measures for stopping all the controls are adopted.

On the other hand, U.S. Pat. No. 5,530,651 discloses a traveling safety device which changes a control logic so that traveling can be made in safety within the range that a radar apparatus can make detection when detection performance of the radar apparatus is reduced.

In the conventional method of stopping of all the controls, however, when the radar apparatus detects an obstruction short distance away, the traveling control or the alarm control cannot be performed and accordingly it is not desirable in safety.

Further, in the method of changing the control logic, a control range for a distance at which control is started is changed in accordance with detection performance of the radar apparatus and accordingly when judgment accuracy of detection performance deteriorates or when a strong reflection signal from a large obstruction is received, the obstruction is sometimes detected far from the maximum detecting distance of the detection performance of the radar apparatus. In such a case, alarm cannot be produced.

Other objects, features and advantages of the invention will become apparent from the following description of the embodiments of the invention taken in conjunction with the accompanying drawings.

SUMMARY OF THE INVENTION

It is an object of the present invention to provide a vehicle control apparatus having high safety by stopping various traveling control apparatuses in accordance with detection performance of the radar apparatus individually so that obstruction information detected can be utilized at the maximum regardless of the detection performance of the radar apparatus.

It is a further object of the present invention to enhance the safety of the system by notifying an operation stopped state of vehicle control or alarm control to a driver.

It is a further object of the present invention to automatically detect detection performance of obstruction detection means by means of an RCS value of a detected moving body.

It is a further object of the present invention to automatically detect detection performance of a radar apparatus by means of a maximum detection distance of a detected moving body or stationary object.

It is a further object of the present invention to allow each external control apparatus to judge stop of operation by outputting a detection performance level of a radar apparatus of a vehicle outside.

The above object can be achieved by the provision of obstruction detection means for measuring a headway distance until an obstruction existing in front of a vehicle by means of a radar apparatus, means for performing vehicle control or alarm control on the basis of the headway distance, means for detecting detection performance of the obstruction detection means in a vehicle in which the obstruction detection means is used to perform two or more controls containing the vehicle control or alarm control, and means for controlling to stop operation of the vehicle control or alarm control in accordance with the detection performance individually.

Further, the present invention comprises means for notifying an operation stopped state of vehicle control or alarm control to a driver.

Further, the present invention comprises obstruction detection means for detecting an obstruction existing in front of the vehicle by means of the radar apparatus, means for acquiring a speed of the vehicle, means for identifying a moving body from the obstruction on the basis of the speed, means of calculating an RCS value of the moving body, statistical processing means for calculating an average or dispersion of the RCS value, and means for detecting detection performance of the obstruction detection means on the basis of a result of said statistical processing.

Further, the present invention comprises obstruction detection means for detecting an obstruction existing in front of the vehicle by means of the radar apparatus, means for acquiring a distance at which an obstruction begins to be detected or a distance at which an obstruction begins to be missed, and means for detecting detection performance of the obstruction detection means on the basis of the distance at which the obstruction begins to be detected or the distance at which the obstruction begins to be missed.

Further, the present invention comprises obstruction detection means for measuring a headway distance until an obstruction existing in front of the vehicle or a relative speed to the obstruction, means for classifying detection performance of the obstruction detection means into a plurality of levels, and means for outputting the level outside.

DESCRIPTION OF THE EMBODIMENTS

Figure 1:
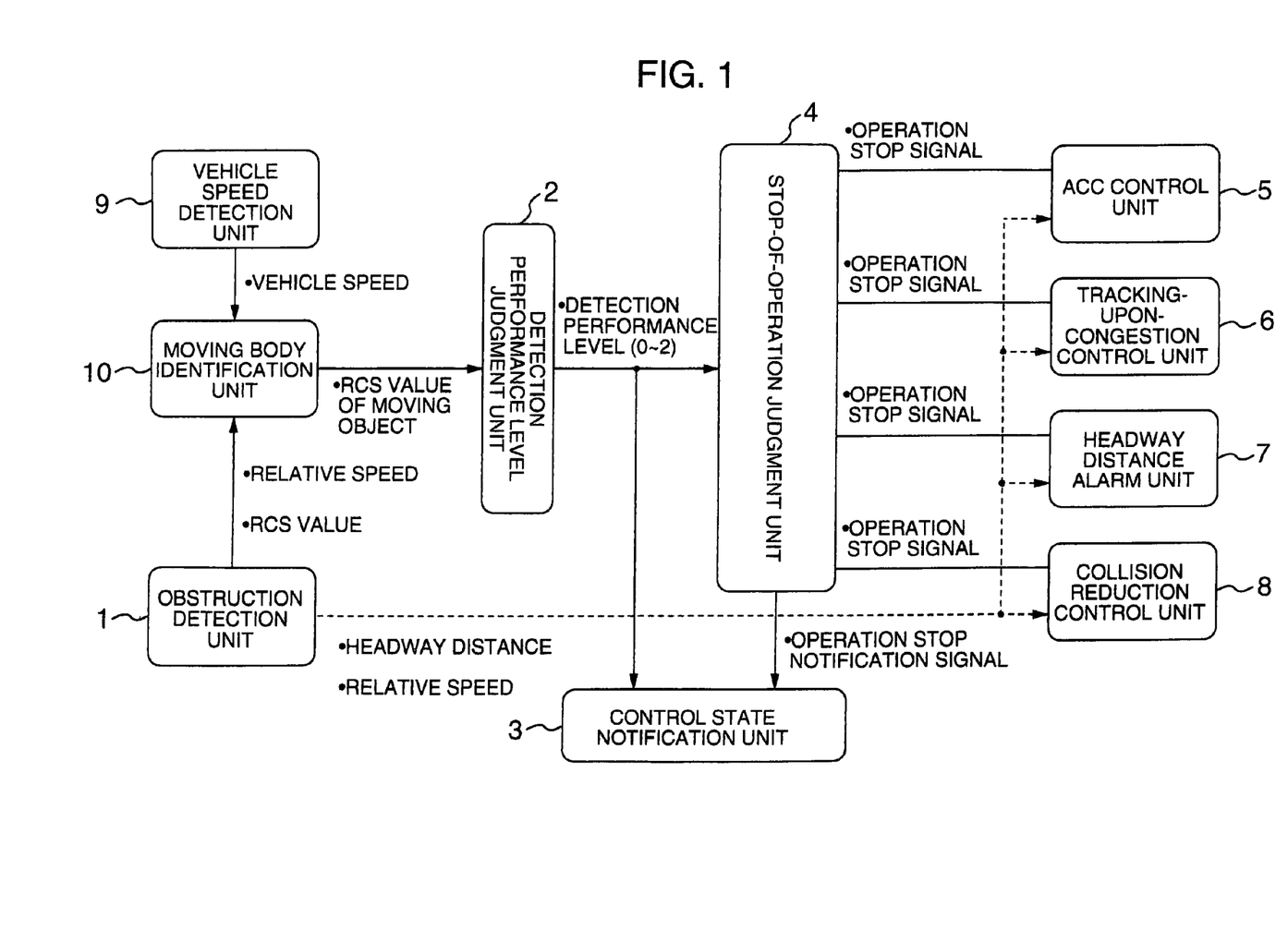
FIG. 1 is a block diagram schematically illustrating a vehicle control apparatus of the present invention.

Embodiments of the present invention are now described with reference to the accompanying drawings. FIG. 1 is a block diagram schematically illustrating a vehicle control apparatus according to an embodiment of the present invention. In the embodiment, a millimeter-wave radar is used as an obstruction detection unit 1 for detecting an obstruction. The obstruction detection unit produces information concerning a headway distance between a detected obstruction and a vehicle, a relative speed therebetween, a radar cross section (RCS) value and the like. The RCS value is described later. The information concerning the headway distance and the relative speed is supplied to an adaptive cruise control (ACC) unit 5, a tracking-upon-congestion control unit 6, a headway distance alarm unit 7, a collision reduction control unit 8 to thereby perform various control operations.

On the other hand, a moving body identification unit 10 uses a speed value detected by a speed detection unit 9 to judge whether a detected obstruction is a moving body or not. The speed detection unit 9 uses the following equation (1) as a judgment equation thereof and judges that the obstruction satisfying the equation (1) is a moving body. The left side of the equation (1) represents a moving speed of the obstruction and Vc represents a predetermined speed threshold.

$$|\text{Relative Speed} + \text{Vehicle Speed}| \geq Vc$$

The RCS value of the obstruction judged as a moving body is processed in a detection performance level judgment unit 2 to thereby calculate three detection performance levels (0 to 2) in accordance with detection performance of the obstruction detection unit 1. A stop-of-operation judgment unit 4 uses the calculated detection performance level to control to stop operation of the ACC control unit 5, the tracking-upon-congestion control unit 6, the headway distance alarm unit 7 and the collision reduction control unit 8 individually.

Further, when detection performance of the obstruction detection unit 1 is reduced or there is any control unit which fails to operate, a control state notification unit 3 notifies that effect to the driver by means of sound or light.

Figure 10:
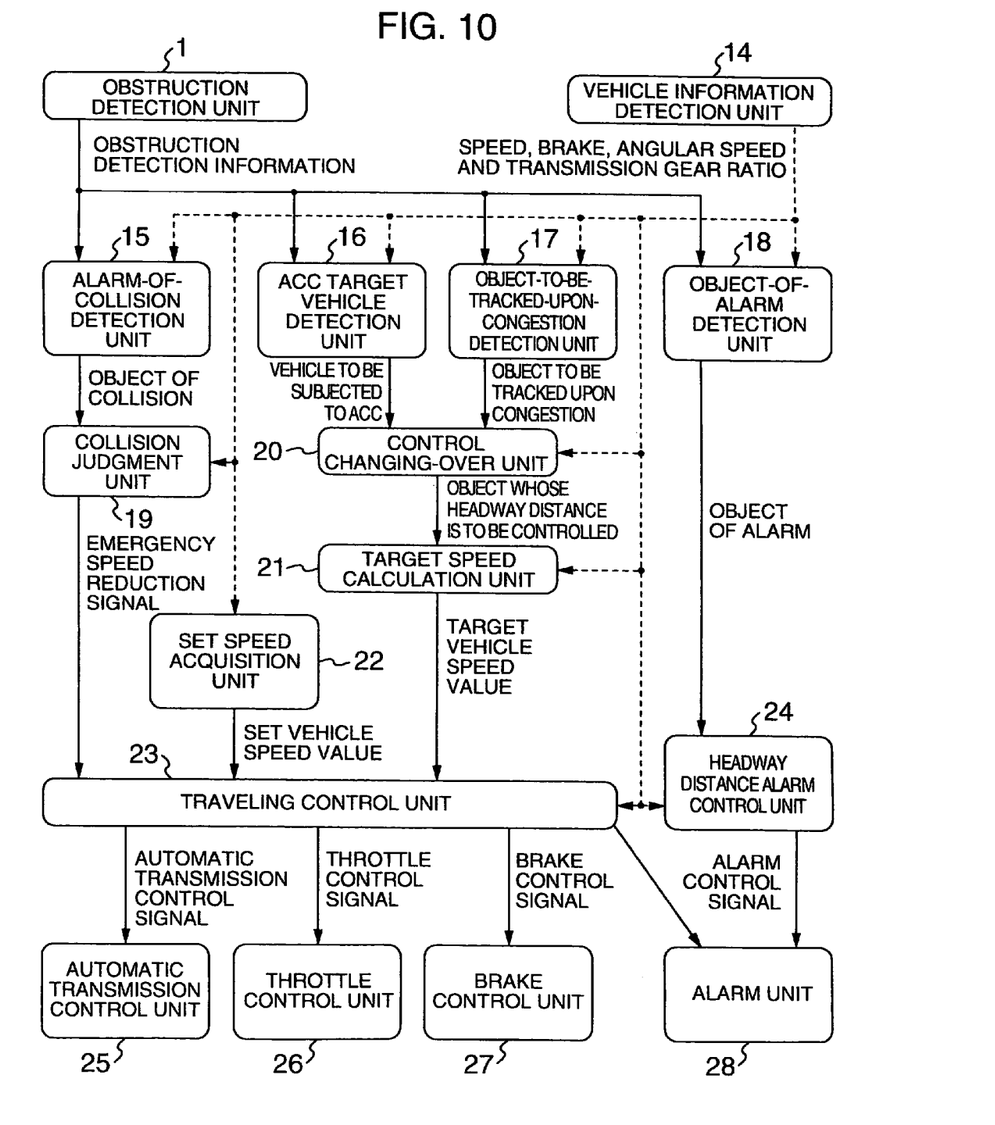
FIG. 10 is a block diagram for explaining various control contents.

Control contents of the ACC control unit 5, the tracking-upon-congestion control unit 6, the headway distance alarm unit 7 and the collision reduction control unit 8 are described with reference to FIG. 10. FIG. 10 is a block diagram explaining the control contents. Portion shown by broken line in FIG. 1 is described.

The ACC control unit 5 is first described. The ACC control unit 5 includes, as shown in FIG. 10, the obstruction detection unit 1, a vehicle information detection unit 14, an ACC target vehicle detection unit 16, a control changing-over unit 20, a target speed calculation unit 21, a set speed acquisition unit 22, a traveling control unit 23, an automatic transmission control unit 25, a throttle control unit 26 and a brake control unit 27.

First, the obstruction detection unit 1 detects an obstruction existing on the periphery of the vehicle (a host vehicle) and calculates obstruction detection information containing a headway distance between the obstruction and the host vehicle, a relative speed (moving speed) and an azimuth angle. On the other hand, the vehicle information detection unit 14 acquires information containing a vehicle speed, a brake, an angular speed and a transmission gear ratio of the automatic transmission.

The ACC target vehicle detection unit 16 calculates a moving speed of the obstruction on the basis of the speed of the host vehicle and its relative speed to the obstruction and determines that the nearest moving object running on the same lane of the host vehicle is a preceding vehicle as a target for the ACC of the host vehicle on the basis of obstruction detection information. It may be defined that when the moving speed of the obstruction is higher than or equal to a predetermined value (for example, 15 percents of the speed of host vehicle), it is determined that the obstruction is a moving body.

The control changing-over unit 20 changes over the ACC control unit and the tracking-upon-congestion control unit and sends information concerning the detected preceding vehicle followed by the host vehicle having ACC to the target speed calculation unit 21 as a target object in order to perform ACC control when the vehicle speed value is higher than or equal to a predetermined value (for example, 40 km/h).

The target speed calculation unit 21 calculates a target speed of host vehicle on the basis of the received information concerning the object whose headway distance is to be controlled and the vehicle speed. Further, the set speed acquisition unit 22 acquires a speed value set by the driver and supplies the set speed value together with the calculated target speed value to the traveling control unit 23. The traveling control unit 23 prepares an automatic transmission control signal, a throttle control signal and a brake control signal so that the actual vehicle speed is equal to the target speed and controls the automatic transmission control unit 25 for shifting the transmission, the throttle control unit 26 for opening and closing the throttle, and the brake control unit 27 for turning on and off the brake. However, when the target speed exceeds the set speed, the target speed value is replaced with the set speed value so that the set speed value becomes the target speed value.

The tracking-upon-congestion control unit 6 is now described. The tracking-upon-congestion control unit 6 includes, as shown in FIG. 10, the obstruction detection unit 1 (for example, a radar device), the vehicle information detection unit 14, an object-to-be tracked-upon-congestion detection unit 17, the control changing-over unit 20, the target speed calculation unit 21, the set speed acquisition unit 22, the traveling control unit 23, the automatic transmission control unit 25, the throttle control unit 26 and the brake control unit 27.

First, the obstruction detection unit 1 detects an obstruction existing on the periphery of the vehicle and calculates obstruction detection information containing a headway distance, a relative speed (moving speed) and an azimuth angle. On the other hand, the vehicle information detection unit 14 acquires information containing a vehicle speed, braking operation, an angular speed and a gear ratio of the automatic transmission.

The object-to-be-tracked-upon-congestion detection unit 17 detects an obstruction nearest to host vehicle within the lane in which host vehicle travels as an object to be tracked upon congestion. The control changing-over unit 20 changes over the ACC control unit and the tracking-upon-congestion control unit and supplies information concerning the detected object-to-be-tracked-upon-congestion to the target speed calculation unit 21 as a target object in order to make control by the tracking-upon-congestion control unit when the speed of the vehicle is smaller than a predetermined value (for example 40 km/h).

Description subsequent to the target speed calculation unit 21 is the same as the foregoing paragraph.

The headway distance alarm unit 7 is now described. The headway distance alarm unit 7 includes, as shown in FIG. 10, the obstruction detection unit 1, the vehicle information detection unit 14, an object-of-alarm detection unit 18, a headway distance alarm control unit 24 and an alarm unit 28.

First, the obstruction detection unit 1 detects an obstruction existing on the periphery of the vehicle and calculates obstruction detection information containing a headway distance, a relative speed (moving speed) and an azimuth angle.

On the other hand, the vehicle information detection unit 14 acquires information containing a vehicle speed, a brake, an angular speed and a gear ratio of the automatic transmission.

The object-of-alarm detection unit 18 calculates a time taken until host vehicle collides with each of all the detected obstructions on the basis of the relative speed and the vehicle speed thereof and detects the obstruction having a minimum time as an object of alarm. However, when there is no possibility that host vehicle collides with each of all the obstructions, the object-of-alarm detection unit 18 regards the obstruction nearest to host vehicle on the lane in which host vehicle travels as an object of alarm.

The headway distance alarm control unit 24 judges whether an alarm is produced or not on the basis of the object of alarm. When the headway distance between the object of alarm and host vehicle is shorter than or equal to a predetermined value (changed in accordance with the vehicle speed and the relative speed), the control unit 24 produces an alarm control signal to cause the alarm unit 28 to warn the driver by means of light or sound.

The collision reduction control unit 8 is now described. The collision reduction control unit 8 includes, as shown in FIG. 10, the obstruction detection unit 1, the vehicle information detection unit 14, an object-of-collision detection unit 15, a collision judgment unit 19, the traveling control unit 23, the automatic transmission control unit 25, the throttle control unit 26, the brake control unit 27 and the alarm unit 28.

First, the obstruction detection unit 1 detects an obstruction existing on the periphery of the vehicle and calculates obstruction detection information containing a headway distance, a relative speed (moving speed) and an azimuth angle. On the other hand, the vehicle information detection unit 14 acquires information containing a vehicle speed, a brake, an angular speed and a transmission gear ratio of the automatic transmission.

When the speed of host vehicle is higher than or equal to a predetermined value (for example 30 km/h) and an obstruction is detected within the headway distance shorter than or equal to a predetermined value (for example 3 m), the object-of-collision detection unit 15 detects the obstruction as the object of collision.

The collision judgment unit 19 calculates a hazardous degree for the object of collision. In the embodiment, the relative speed is used as the degree of hazardous. When the relative speed (a negative value represents an approach direction) for the object of collision is smaller than or equal to a predetermined value (for example −30 km/h), the collision judgment unit 19 judges that host vehicle is in a high-risk situation and produces an emergency speed reduction signal.

When the traveling control unit 23 receives the emergency speed reduction signal, the traveling control unit 23 produces an alarm control signal to cause the alarm unit 28 to warn the driver by means of light or sound and controls the automatic transmission control unit 25, the throttle control unit 26 and the brake control unit 27 to reduce the speed rapidly.

Figure 2:
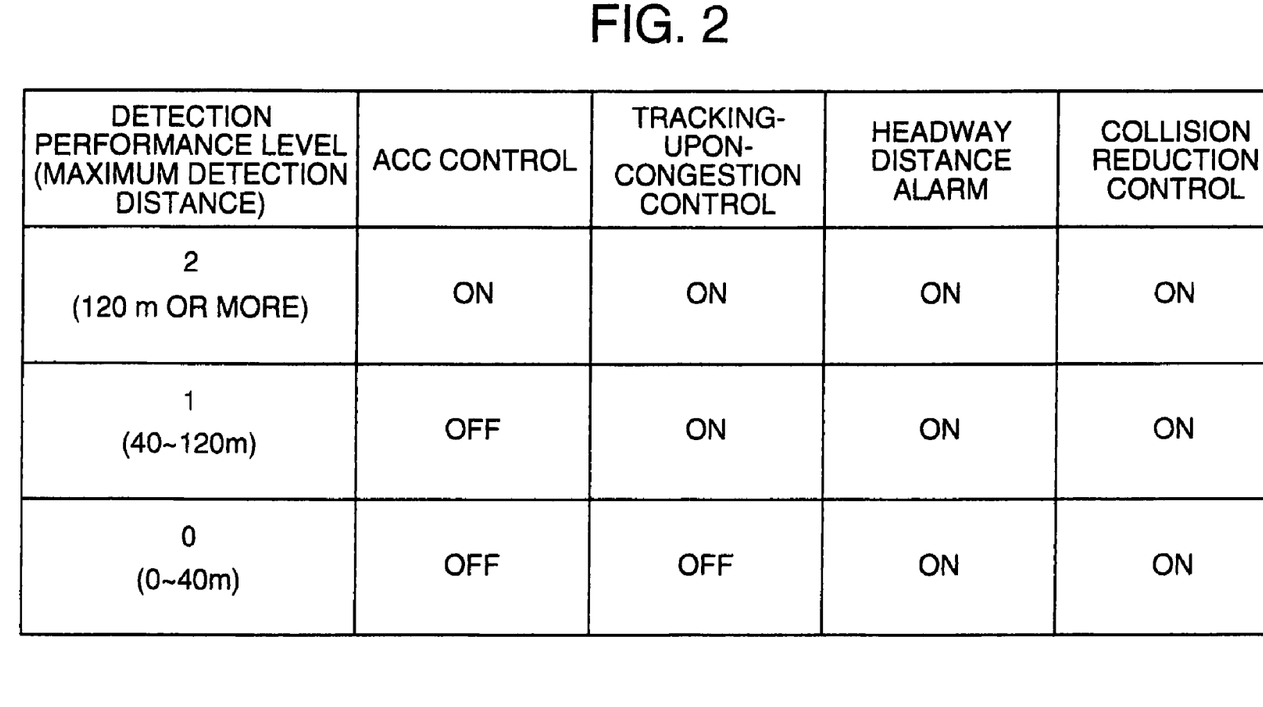
FIG. 2 shows an operation table of various control apparatuses.

Referring now to FIG. 2, control contents of the stop-of-operation judgment unit 4 are described. Generally, the detection performance levels 0 to 2 are equivalent to the maximum detection distance of the obstruction detection unit 1 classified into three levels. In the embodiment, the detection performance level of 2 indicates that the maximum detection distance is usual (e.g. 120 meters or more), the detection performance level of 1 indicates that the maximum detection distance is deteriorated (e.g. between 40 to 120 meters) and the detection performance level of 0 indicates that the maximum detection distance is very deteriorated (e.g. between 0 to 40 meters).

The table shown in FIG. 2 represents that when the detection performance level is 2, all functions of the ACC control, the tracking-upon-congestion control, the headway distance alarm and the collision reduction control can be operated. Further, when the detection performance level is 1, only the ACC control is prohibited to be operated and when the detection performance level is 0, the ACC control and the tracking-upon-congestion are prohibited to be operated. That is, the headway distance alarm and the collision reduction control are operated in all levels even when the detection performance of the radar apparatus is reduced.

Figure 3:
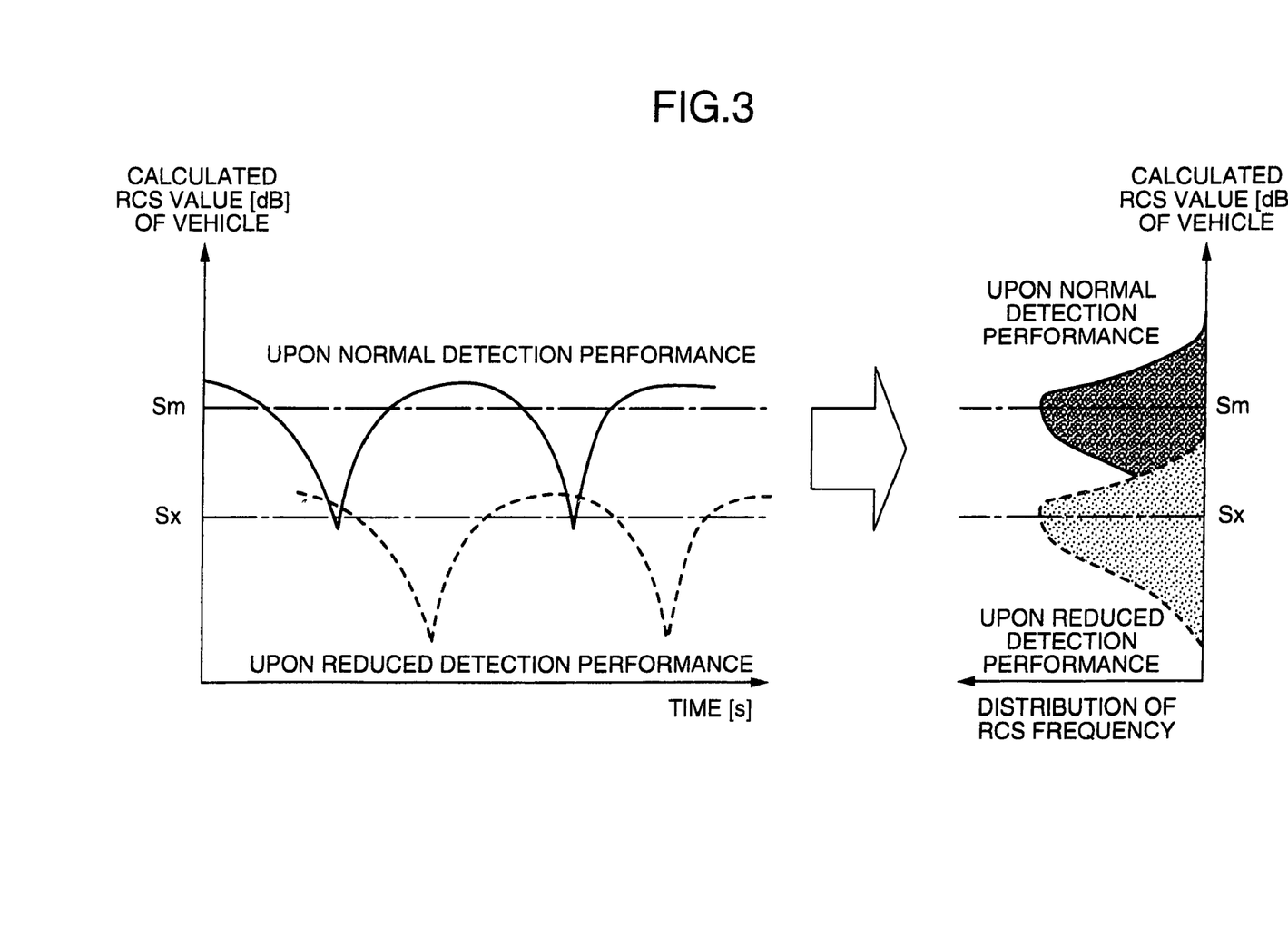
FIG. 3 is a diagram showing distribution of calculated RCS values.

Referring now to FIG. 3, the method of detecting the detection performance level by the detection performance level judgment unit 2 is described. The radar cross section (RCS) is a scale indicative of a reflection factor of an obstruction and can be calculated by a radar equation (2). However, since a received power Pr is inversely proportional to the fourth power of a distance R ($Pr \propto R^{-4}$), $Rr \times R^4$ is always constant for the same obstruction and a calculated RCS value σ is also constant.

$$\sigma = K \times Pr \times R^4 \quad (2)$$

σ: calculated RCS value
K: characteristic value (fixed value) of radar apparatus
Pr: received power
R: distance between radar device and obstruction When the detection performance is reduced due to a heavy rain or dirt attached, the received power Pr for the same distance R is reduced and accordingly the calculated RCS value σ is also calculated to be small. A reduced value of the calculated RCS value can be detected to thereby calculate the detection performance of the obstruction detection unit 1.

FIG. 3 shows calculated RCS values of a vehicle and a distribution thereof. The left of FIG. 3 shows an example of calculated RCS values for a vehicle calculated actually.

In this connection, it is considered that there are several reasons that downward spikes appear in the graph shown in the left of FIG. 3.

One of the reasons is the problem of multipath that a signal reflected directly by the preceding vehicle and a signal containing reflection by a road interfere with each other when the radar detects the vehicle. In addition, reflection by a wall of an expressway, an inner wall of a tunnel, vehicles existing on the periphery and the like is considered.

Further, the reflection factor of the radar is sometimes changed because of a vehicle squeezing before host vehicle to thereby reduce an amount of information received or the direction of a target (e.g. a preceding vehicle) is sometimes changed to thereby reduce an amount of information received.

The right of FIG. 3 shows a distribution of frequency of the calculated RCS values σ shown in the left thereof. When the detection performance of the obstruction detection unit 1 is normal, the calculated RCS values of vehicle are distributed to be concentrated near Sm as shown by solid line of FIG. 3 (σ≈Sm). However, Sm is a fixed value previously measured when the detection performance is normal. Sm can be set as a statistic such as, for example, an average value, a center of gravity and a mode.

Similarly, when the detection performance of the obstruction detection unit 1 is reduced, the calculated RCS values σ of vehicle are distributed to be concentrated near Sx smaller than Sm as shown by dotted line of FIG. 3. Accordingly, a center position Sx of the calculated RCS values distributed can be calculated to be compared with Sm, so that the detection performance of the obstruction detection unit 1 can be detected.

Figure 4:
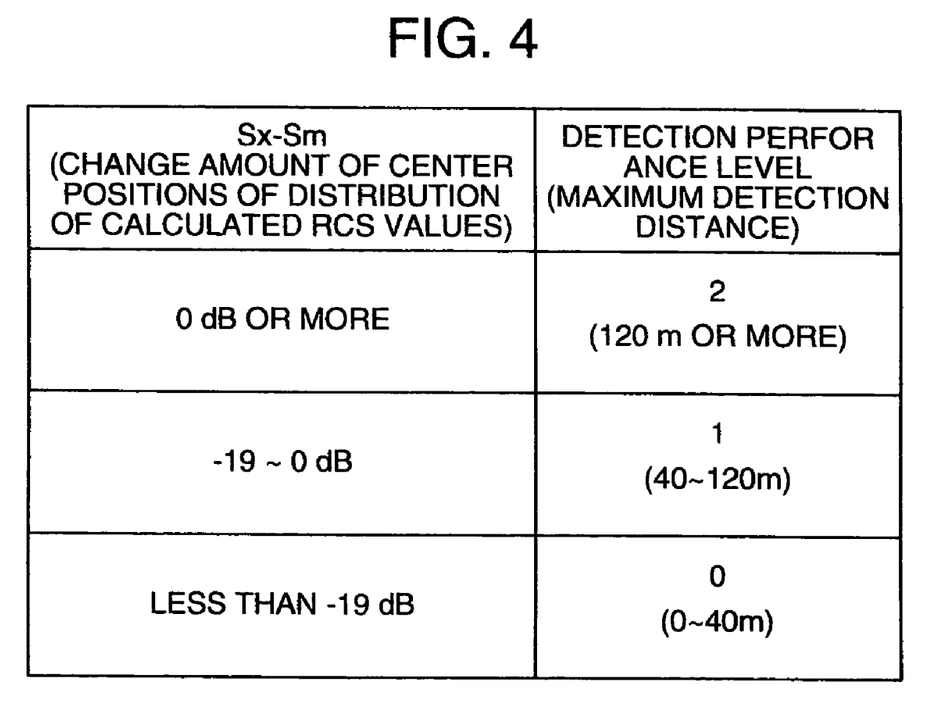
FIG. 4 shows a table representing correspondence between calculated RCS values and detection performance levels.

FIG. 4 shows a relation of the calculated Sx and the detection performance level. The detection performance level is calculated in accordance with this table. That is, when σ−Sm≧0 [db], the maximum detection distance is judged to be normal (e.g. 120 m or more) since the detection performance is not reduced and the detection performance level is set to 2. Further, when −19≦σ−Sm≦0 [db], the maximum detection distance is judged to be deteriorated (e.g. 40 to 120 m) and the detection performance level is set to 1. When σ−Sm≦−19 [db], the maximum detection distance is judged to be very deteriorated (e.g. 40 m or less) and the detection performance level is set to 0.

Figure 5:
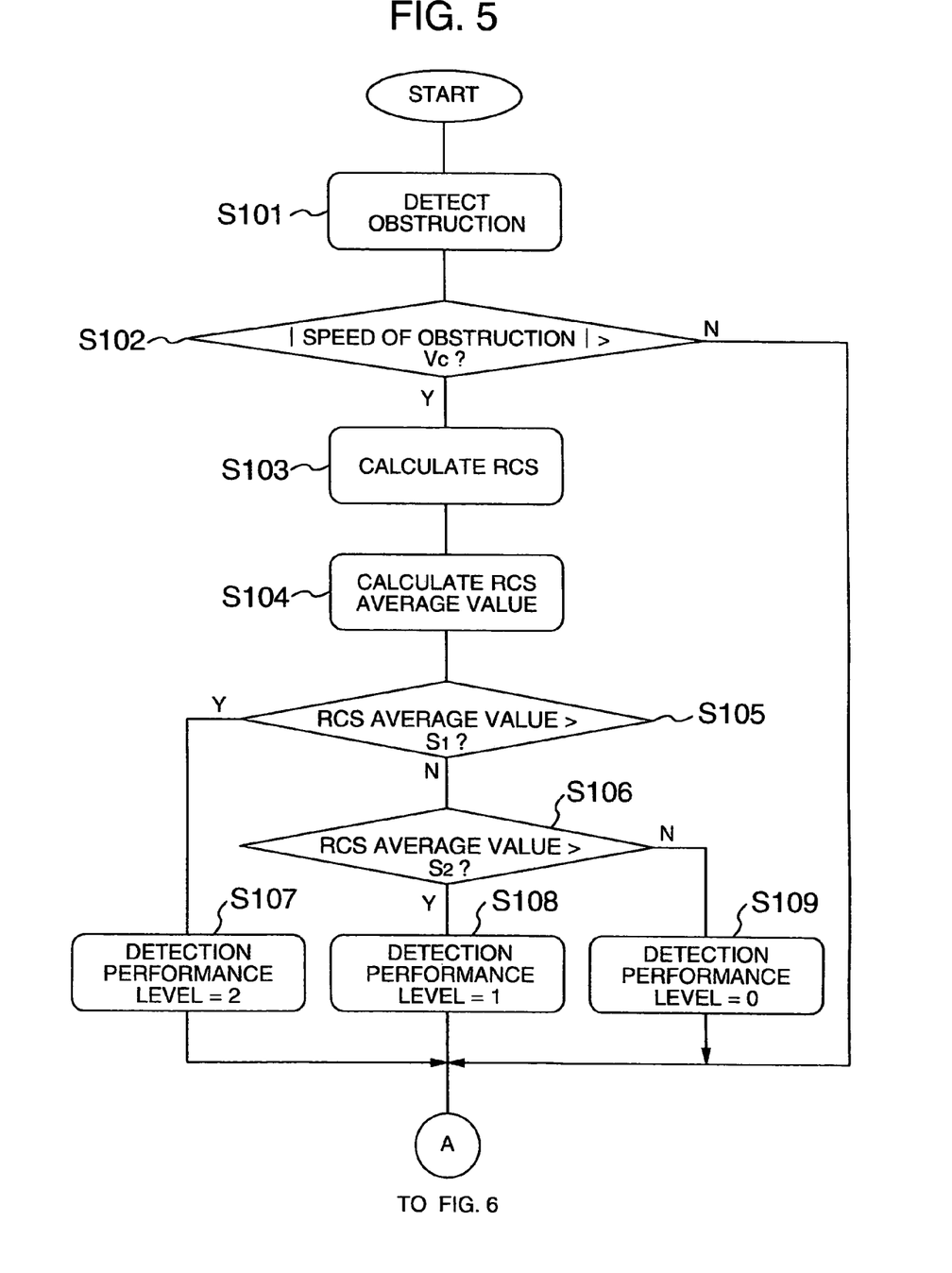
FIG. 5 is a flow chart (first half) showing vehicle control of the present invention.
Figure 6:
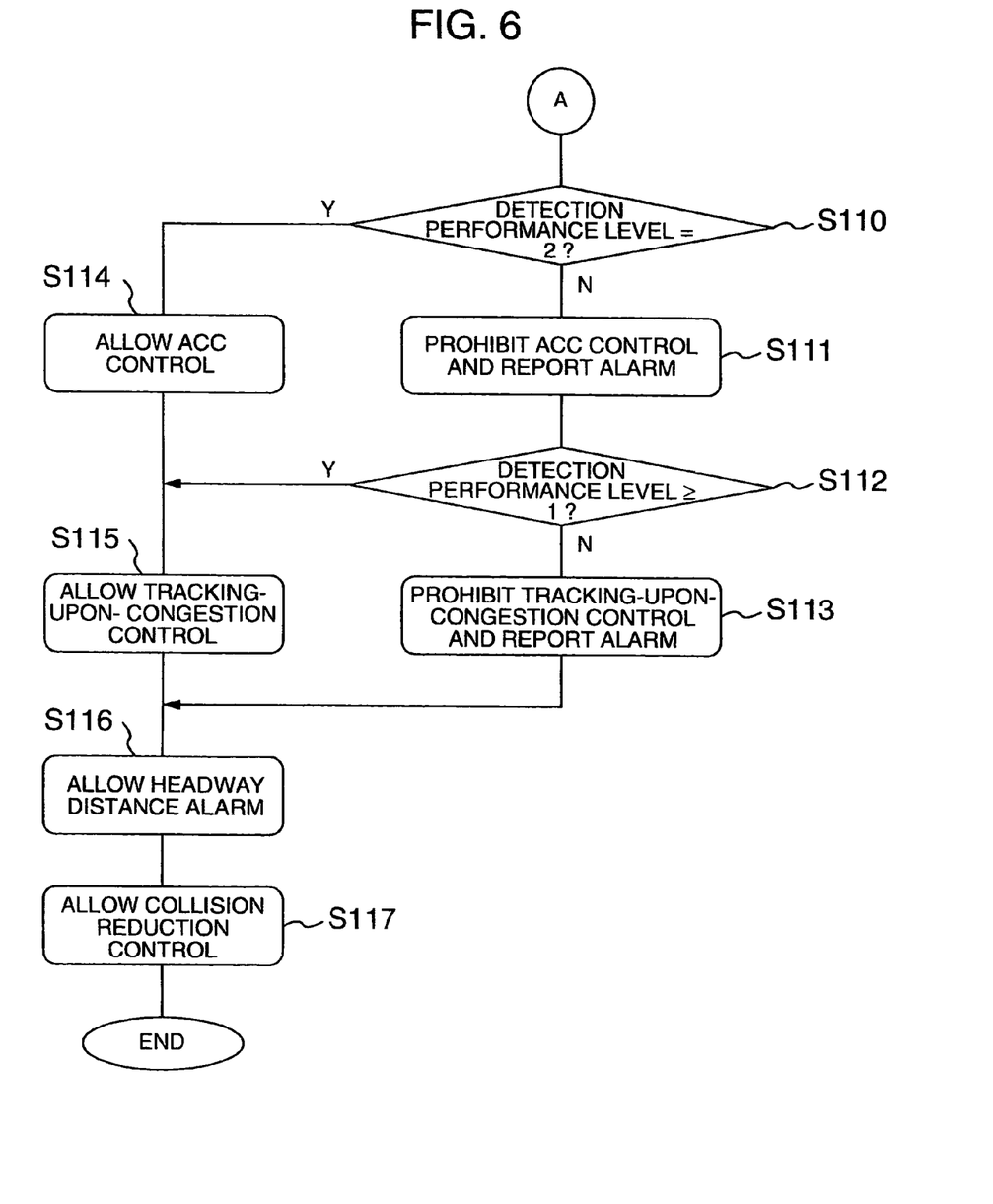
FIG. 6 is a flow chart (second half) showing vehicle control of the present invention.

FIGS. 5 and 6 show a processing flow described above. In step S101, the radar apparatus mounted in a vehicle is used to detect an obstruction existing in front of the vehicle. Next, in order to judge whether the detected obstruction is a vehicle or not, a moving speed of the obstruction is calculated to judge whether the moving speed is larger than or equal to a predetermined value Vc.

When the moving speed is larger than the predetermined value Vc, the obstruction is judged to be a vehicle and the processing procedure proceeds to S103. Further, when the moving speed is smaller than or equal to the predetermined value Vc, the processing procedure skips the processing of judging the detection performance level and proceeds to S110.

In step S103, an RCS value σ is calculated from a received power for the vehicle and a headway distance and an average value $\sigma_{ave}$ of the RCS value is calculated in S104. In S105, the RCS average value $\sigma_{ave}$ is compared with $S_1$ and when the RCS average value $\sigma_{ave}$ is larger than $S_1$, the detection performance level is judged to be 2. Further, when the RCS average value is smaller than or equal to $S_1$, the processing procedure proceeds to S106 and the RCS average value $\sigma_{ave}$ is compared with $S_2$. When the RCS average value $\sigma_{ave}$ is larger than S2, the detection performance level is judged to be 1 and when it is not larger than $S_2$, the detection performance level is judged to be 0.

Next, the detection performance level calculated is used to judge whether the ACC control is stopped or not in S110. When the detection performance level is 2, the processing procedure proceeds to S114 and operation of the ACC control is allowed. When it is not 2, the processing procedure proceeds to S111 and an alarm for reporting that the detection performance is reduced and the ACC control is stopped is given by means of sound or light (S111). Similarly, it is judged whether the tracking-upon-congestion control is stopped in S112. When the detection performance level is larger than or equal to 1, the processing procedure proceeds to S115 and operation of the tracking-upon-congestion control is allowed. When it is not larger than or equal to 1, the processing procedure proceeds to S113, in which an alarm for reporting that the detection performance is reduced and the tracking-upon-congestion control is stopped is given by means of sound or light (S113) and the processing procedure proceeds to S116. Operation of the headway distance alarm in S116 and the collision reduction control in S117 is performed regardless of the detection performance level.

Figure 7:
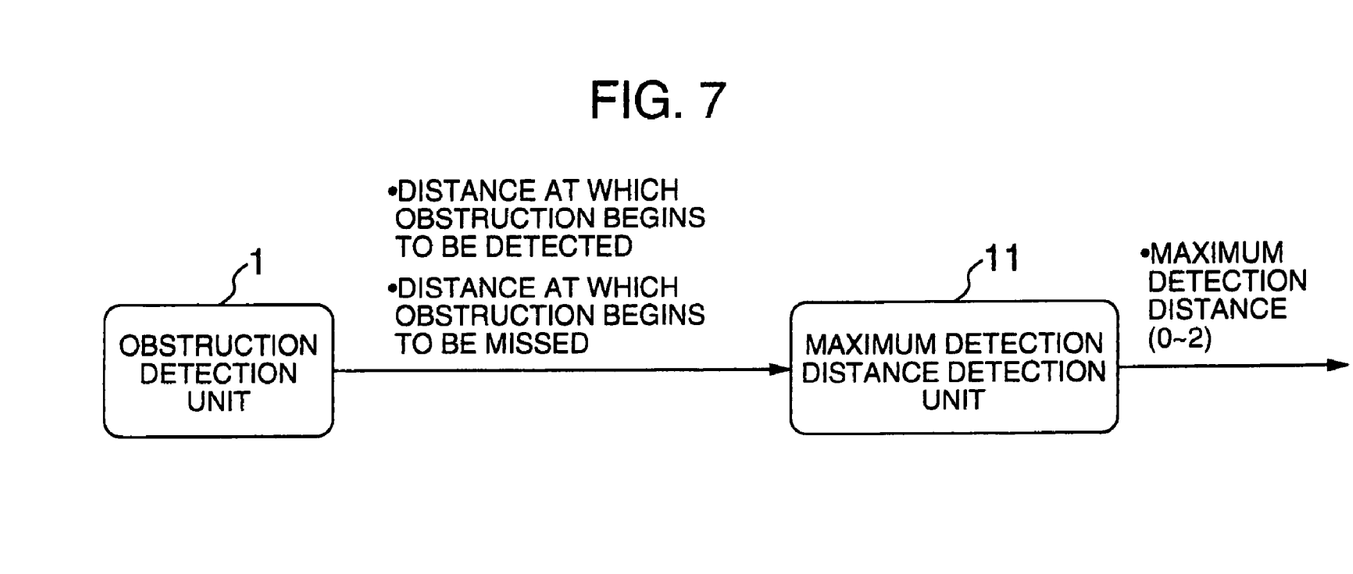
FIG. 7 is a block diagram explaining a method of calculating a maximum detection distance.
Figure 9:
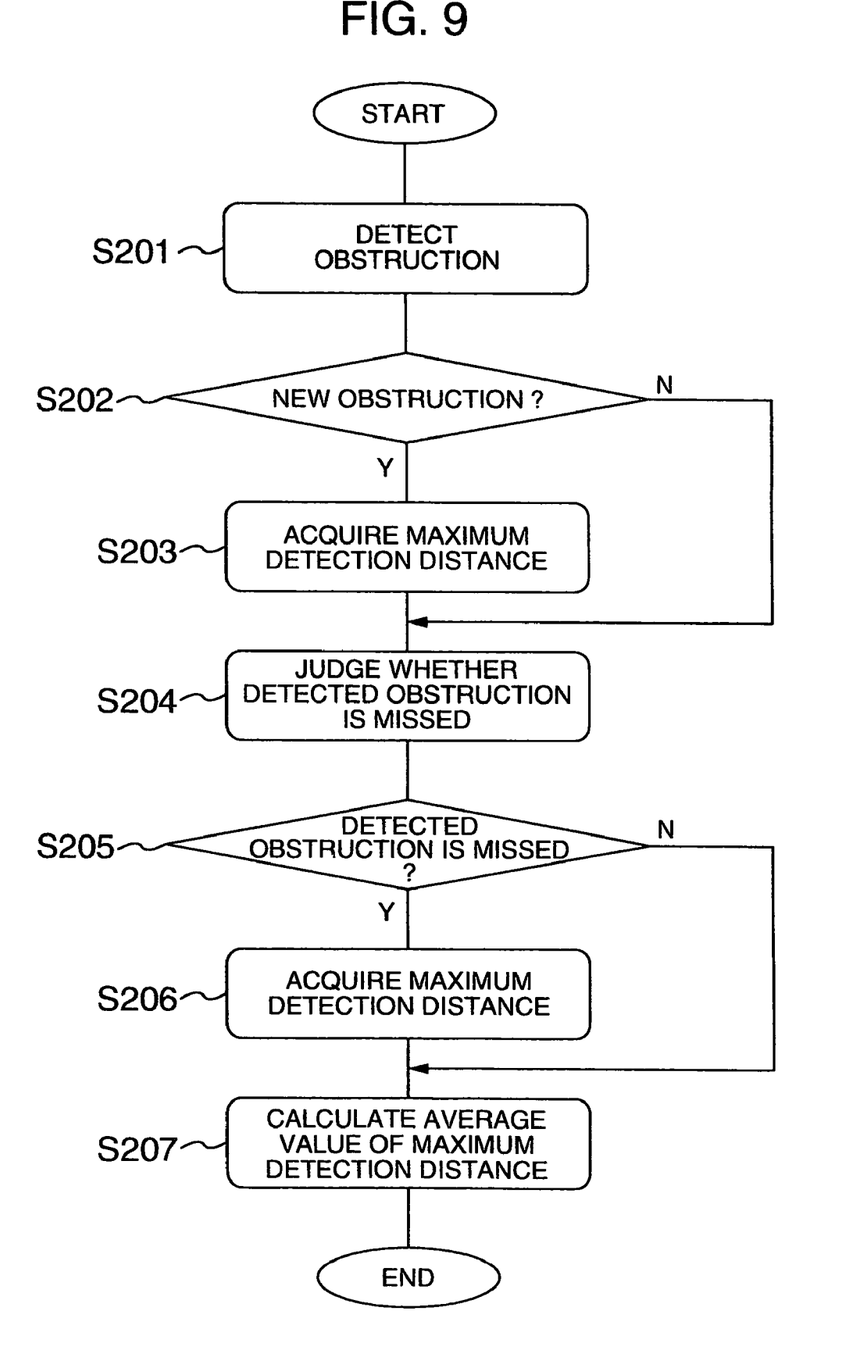
FIG. 9 is a flow chart showing processing for calculating a maximum detection distance.

FIG. 7 shows a next embodiment. The obstruction detection unit 1 is used to calculate a distance at which an approaching obstruction begins to be detected or a distance at which an obstruction going away begins to be missed and the maximum detection distance detection unit 11 uses the distance to calculate a maximum detection distance of the obstruction detection unit 1. Its processing flow is shown in FIG. 9.

First, an obstruction is detected in step S201 and it is judged whether the obstruction is a newly detected obstruction or not in S202. When it is the newly detected obstruction, a distance to the obstruction is regarded as a maximum detection distance in S203 while when it is an already detected obstruction, the processing procedure jumps to S204.

In S204, it is judged whether the already detected obstruction is missed or not. When the already detected obstruction is not coincident with the obstruction detected this time, it is judged that the obstruction is missed in S205 and the processing procedure proceeds to S206, in which the distance at which the obstruction is missed is regarded as the maximum detection distance. Further, when it is coincident, it is judged that the obstruction is being detected and processing procedure proceeds to S207, in which the maximum detection distance is used to calculate its average value. The calculated average value of the maximum detection distance is used to decide the detection performance level as shown in FIG. 2.

Figure 8:
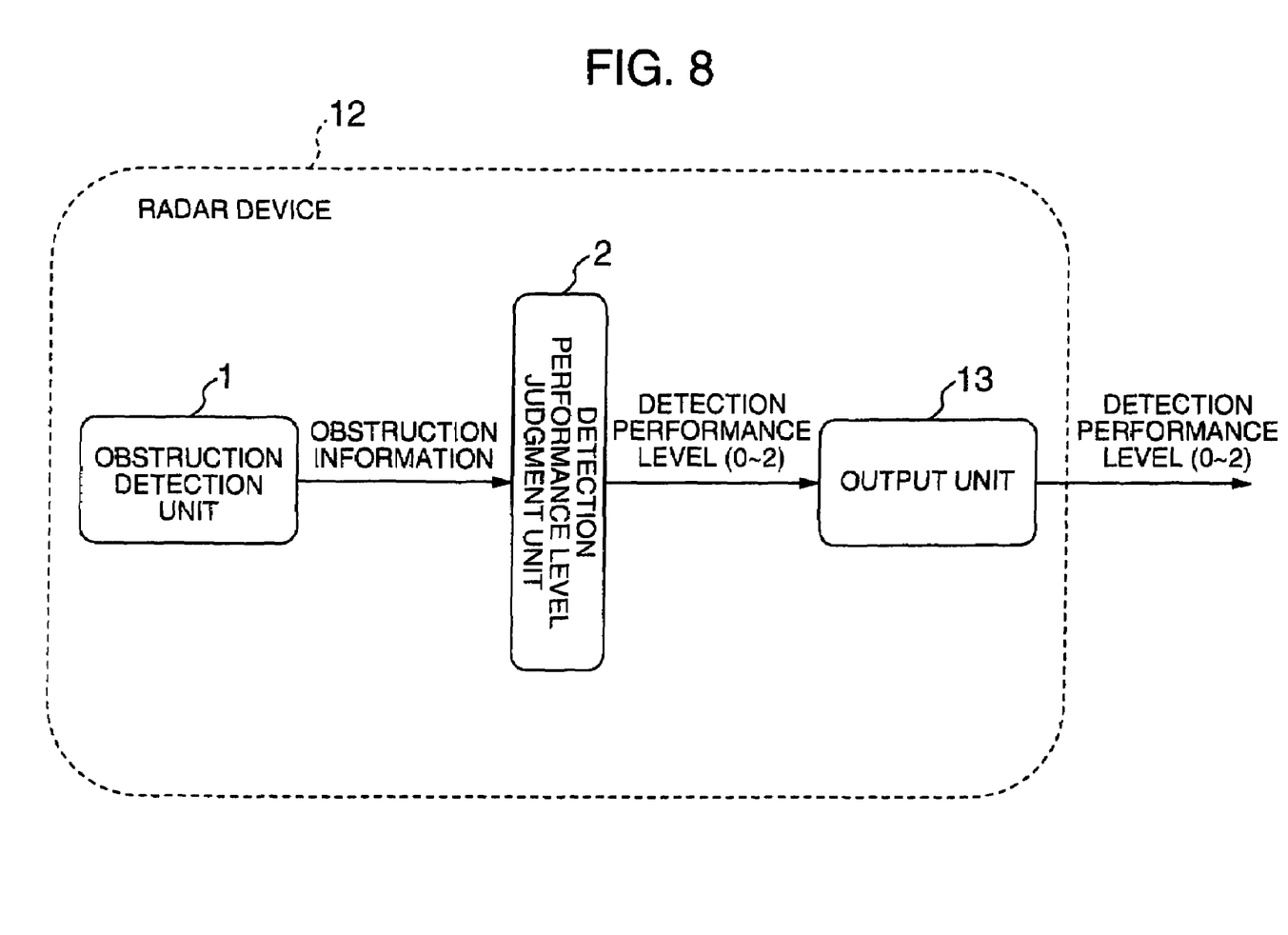
FIG. 8 is a block diagram explaining that a detection performance level is outputted outside.

FIG. 8 shows a next embodiment. The obstruction detection unit 1, the detection performance level judgment unit 2 and an external output unit 13 may be included in the radar apparatus 12 to thereby output the detection performance level classified into the plurality of levels outside of the radar apparatus 12.

In the embodiment, the detection performance level is divided into three levels, while it may be divided two or four levels.

According to the present invention, the detection performance level of the radar apparatus is detected and even when the detection performance level is reduced, control of vehicle and operation control of the alarm controller are made individually so that the detection information of the radar apparatus can be utilized at the maximum and accordingly the safety can be improved.

Further, the operation stopped state of vehicle control or alarm control can be notified to the driver to thereby enhance the safety of the system.

In addition, the RCS value of the moving body detected can be used to detect the detection performance of the radar apparatus, so that the detection performance can be detected automatically.

Moreover, the maximum detection distance of the detected moving body or stationary object can be used to detect the detection performance of the radar apparatus, so that the detection performance can be detected automatically.

Further, the detection performance level of the radar apparatus can be outputted outside, so that the external controller can judge to stop operation individually.

It should be further understood by those skilled in the art that the foregoing description has been made on embodiments of the invention and that various changes and modifications may be made in the invention without departing from the spirit of the invention and the scope of the appended claims.

What is claimed is:

1. A control apparatus for a vehicle, said control apparatus comprising:
    obstruction detection means including radar apparatus for measuring a headway distance to an obstruction existing ahead of said vehicle;
    control means for performing a plurality of operation-support functions by controlling at least a throttle, brakes and a transmission of said vehicle according to the headway distance to the obstruction;
    means for detecting a detection performance level of said obstruction detection means; and
    means for causing said control means to individually enable or interrupt operation of said plurality of operation support functions in accordance with said detection performance level.

2. A control apparatus for a vehicle according to claim 1, further comprising means for notifying a driver regarding a state of an operation or stop of said plurality of operation support functions.

3. A control apparatus according to claim 1, further comprising means for classifying detection performance of said obstruction detection means into one of at least three different levels.

4. A control apparatus according to claim 3, wherein:
    said plurality of operation support functions includes at least an alarm control; and
    said alarm control is enabled even though the detected detection performance level of said obstruction detection means is classified into a lowest level among said at least three different levels.

5. A control apparatus according to claim 1, wherein the following are determined:
    a limit value of detection performance level required for each of said plurality of operation support functions; is determined and
    an operation support function having a limit value higher than the detected detection performance level of said obstruction detection means.

6. A control apparatus according to claim 5, wherein:
    said operation support functions includes an adaptive cruise control and an alarm control; and
    the limit value of detection performance level required for the adaptive cruise control is higher than the limit value of detection performance level required for said alarm control.

7. A control apparatus according to claim 1, wherein:
    said control apparatus further comprises means for notifying a driver of information concerning a relation between said vehicle and said obstruction on the basis of the measured headway distance; and
    a method of notifying the driver of said information is changed according to the detected detection performance level.

8. A control apparatus according to claim 1, wherein said means for detecting a detection performance level of said obstruction detection means;
    sets an initial value for a selected distance which is one of i) a distance at which an obstruction approaching said vehicle begins to be detected, and ii) a distance at which an obstruction receding from said vehicle begins to be missed when said obstruction detection means is normal;
    calculates a current value of the selected distance; and
    compares said initial value with said current value to thereby judge detection performance level of said obstruction detection means.

9. A control apparatus according to claim 1, wherein said obstruction detection means is a millimeter-wave radar.

* * * * *